(12) United States Patent
Zhang et al.

(10) Patent No.: US 10,324,896 B2
(45) Date of Patent: Jun. 18, 2019

(54) METHOD AND APPARATUS FOR ACQUIRING RESOURCE

(71) Applicant: Huawei Technologies Co., Ltd., Shenzhen (CN)

(72) Inventors: Jin Zhang, Shenzhen (CN); Changting Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 731 days.

(21) Appl. No.: 14/581,467

(22) Filed: Dec. 23, 2014

(65) Prior Publication Data
US 2015/0113015 A1 Apr. 23, 2015

Related U.S. Application Data

(63) Continuation of application No. PCT/CN2012/077465, filed on Jun. 25, 2012.

(51) Int. Cl.
*G06F 16/13* (2019.01)
*G06F 16/14* (2019.01)
(Continued)

(52) U.S. Cl.
CPC ............ *G06F 16/148* (2019.01); *G06F 16/13* (2019.01); *G06F 16/9558* (2019.01);
(Continued)

(58) Field of Classification Search
CPC .......................... H04L 67/1097; H04L 67/42; G06F 17/30091
See application file for complete search history.

(56) References Cited

U.S. PATENT DOCUMENTS 6,336,115 B1 * 1/2002 Tominaga ......... G06F 17/30067
7,546,334 B2 * 6/2009 Redlich ............ G06F 17/30699
709/201
(Continued)

FOREIGN PATENT DOCUMENTS

CN 1838599 A 9/2006
CN 101170719 A 4/2008
(Continued)

OTHER PUBLICATIONS

"Manual: Configuring file uploads," Retrieved from the Internet: URL:http://www.mediawiki.org/w/index.php?title=Manual:Configuring_file_uploads&oldid=549447 [Retrieved on Aug. 27, 2015], Jun. 13, 2012, 10 pages. (Year: 2012).*
(Continued)

*Primary Examiner* — Brian Whipple
*Assistant Examiner* — James Ross Hollister
(74) *Attorney, Agent, or Firm* — Conley Rose, P.C.

(57) ABSTRACT

A method and an apparatus for acquiring a resource. An embodiment of the present invention provides a method for acquiring a resource, including receiving, by a storage server, a resource check request sent by a first client, where the resource check request carries resource information of a resource to be uploaded by the first client, an identifier of an external link created by a second client, and storage location information corresponding to the external link; searching, by the storage server, according to the identifier, a database configured to store external-link information for an attribute of the external link corresponding to the identifier of the external link, and checking the resource information according to a value of the found attribute; and if the check succeeds, storing, by the storage server the acquired resource or acquired resource location information according to the storage location information.

23 Claims, 8 Drawing Sheets

(51) Int. Cl.
*H04L 29/06* (2006.01)
*H04L 29/08* (2006.01)
*G06F 16/955* (2019.01)

(52) U.S. Cl.
CPC .......... *H04L 67/06* (2013.01); *H04L 67/1097* (2013.01); *H04L 67/42* (2013.01)

(56) References Cited

U.S. PATENT DOCUMENTS

| | | | |
|---|---|---|---|
| 2002/0059360 A1* | 5/2002 | Ito | H04L 29/06 709/203 |
| 2004/0093493 A1* | 5/2004 | Bisbee | G06Q 20/00 713/156 |
| 2006/0218181 A1 | 9/2006 | Jeon | |
| 2007/0094286 A1* | 4/2007 | Murthy | G06F 17/30917 |
| 2009/0037519 A1 | 2/2009 | Young | |
| 2009/0063658 A1* | 3/2009 | Westerhoff | G06F 17/30091 709/219 |
| 2009/0098277 A1 | 4/2009 | Okawa et al. | |
| 2009/0157754 A1 | 6/2009 | Patron et al. | |
| 2010/0011003 A1* | 1/2010 | Carver | H04L 67/06 707/E17.01 |
| 2010/0011091 A1* | 1/2010 | Carver | H04L 29/12594 709/219 |
| 2011/0022642 A1* | 1/2011 | deMilo | G06F 17/30082 707/805 |
| 2011/0087690 A1* | 4/2011 | Cairns | G06F 17/30097 707/769 |
| 2011/0093561 A1 | 4/2011 | Courtay et al. | |
| 2013/0073691 A1* | 3/2013 | Quan | H04L 67/06 709/219 |

FOREIGN PATENT DOCUMENTS

| | | |
|---|---|---|
| CN | 101171709 A | 4/2008 |
| CN | 102067565 A | 5/2011 |
| CN | 102255974 A | 11/2011 |

OTHER PUBLICATIONS

"Manual: Configuring file uploads," Retrieved from the Internet: URL:http://www.mediawiki.org/w/index.php?title=Manual:Configuring_file_uploads&oldid=549447 [Retrieved on Aug. 27, 2015], Jun. 13, 2012, 10 pages.

Lancet, Y., "5 Ways to Send Files to Your Dropbox Without Using Dropbox," Retrieved from the Internet: URL: http://www.makeuseof.com/tag/5-ways-send-files-dropbox-dropbox/# [retrieved on Aug. 27, 2015], Aug. 1, 2011, 6 pages.

Foreign Communication From a Counterpart Application, European Application No. 12880156.0, Extended European Search Report dated Sep. 2, 2015, 9 pages.

Gaode, Q., "A File Upload and Download System with File Access Authority," China Academic Journal Electronic Publishing House, No. 3, Mar. 2006, 3 pages.

Translation of Gaode, Q., "A File Uploaded and Downloaded System with File Access Authority," Mar. 25, 2015, 5 pages.

Foreign Communication From a Counterpart Application, Chinese Application No. 201280000472.6, Chinese Office Action dated Jul. 10, 2014, 6 pages.

Foreign Communication From a Counterpart Application, Chinese Application No. 201280000472.6, Chinese Search Report dated Jun. 30, 2014, 2 pages.

Foreign Communication From a Counterpart Application, PCT Application No. PCT/CN2012/077465, English Translation of International Search Report dated Apr. 4, 2013, 2 pages.

Foreign Communication From a Counterpart Application, PCT Application No. PCT/CN2012/077465, English Translation of Written Opinion dated Apr. 4, 2013, 6 pages.

* cited by examiner

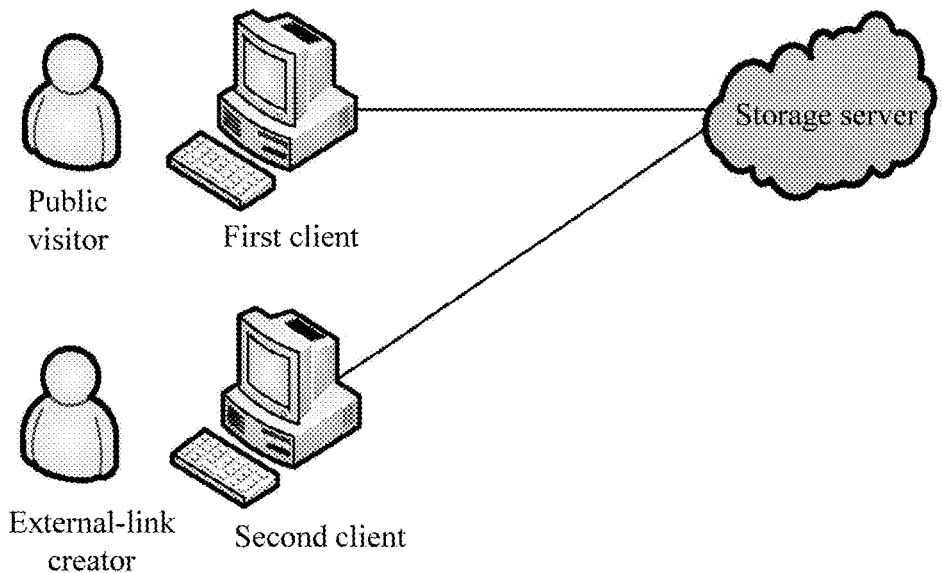

FIG. 1

A storage server receives a resource check request sent by a first client, where the resource check request carries resource information of a resource to be uploaded by the first client, an identifier of an external link created by a second client, and storage location information corresponding to the external link — S201

The storage server searches, according to the identifier of the external link, a database configured to store external-link information for an attribute of the external link corresponding to the identifier of the external link, and checks the resource information according to a value of the found attribute — S202

If the checking succeeds, the storage server stores, according to the storage location information, the acquired resource or acquired resource location information — S203

FIG. 2

METHOD AND APPARATUS FOR ACQUIRING RESOURCE

CROSS-REFERENCE TO RELATED APPLICATION

This application is a continuation of International Application No. PCT/CN2012/077465, filed on Jun. 25, 2012, which is hereby incorporated by reference in its entirety.

TECHNICAL FIELD

The present invention relates to the field of Information Technologies (IT), and in particular to a method and an apparatus for acquiring a resource.

BACKGROUND

With development of storage technologies, a network hard disk has increasingly diversified functions. The network hard disk not only has resource storage and resource access functions, but also has a resource sharing function. In contrast to a conventional resource sharing manner, such as a manner of resource sharing through emails on a small scale, resource sharing can be implemented on a large scale through a network hard disk.

A resource owner may send, through a web page plug-in or a client tool, a resource to a network hard disk of the resource owner for saving, and create an external link corresponding to the uploaded resource, so as to share the uploaded resource with a public visitor through the external link. After acquiring the external link, the public visitor may download, through the external link, the resource uploaded by the resource owner. Because the external link created by the resource owner can be oriented to all users, after acquiring the external link, each user can download, through the external link, the resource stored on the network hard disk, thereby implementing large-scale resource sharing through the network hard disk.

According to an analysis of the prior art, the inventor finds that at least the following problem exists in the prior art.

In the prior art, a public visitor can download, through an external link created by an external-link creator (that is, a resource owner), a resource stored on a network hard disk, but cannot upload, through the external link, a resource to the network hard disk for saving; therefore, the external-link creator cannot acquire a resource through the external link created by the external-link creator.

SUMMARY

An objective of embodiments of the present invention is to provide a method and an apparatus for acquiring a resource, so that an external-link creator can acquire a resource through an external link created by the external-link creator.

According to one aspect, an embodiment of the present invention provides a method for acquiring a resource, including receiving, by a storage server, a resource check request sent by a first client, where the resource check request carries resource information of a resource to be uploaded by the first client, an identifier of an external link created by a second client, and storage location information corresponding to the external link; searching, by the storage server, according to the identifier of the external link, a database configured to store external-link information for an attribute of the external link corresponding to the identifier of the external link, and checking the resource information according to a value of the found attribute; and if the check succeeds, storing, by the storage server, the acquired resource or acquired resource location information according to the storage location information.

According to another aspect, an embodiment of the present invention provides a method for acquiring a resource, including acquiring, by a first client, resource information of a resource to be uploaded; and sending, by the first client, a resource check request to a storage server, where the resource check request carries the resource information, an identifier of an external link created by a second client, and storage location information corresponding to the external link, so that the storage server searches, according to the identifier of the external link, a database configured to store external-link information for an attribute of the external link corresponding to the identifier of the external link, checks the resource information according to a value of the found attribute, and stores the acquired resource according to the storage location information after the check succeeds.

According to one aspect, an embodiment of the present invention provides a storage server, including a receiving unit configured to receive a resource check request sent by a first client, where the resource check request carries resource information of a resource to be uploaded by the first client, an identifier of an external link created by a second client, and storage location information corresponding to the external link; a querying unit configured to search, according to the identifier of the external link received by the receiving unit, a database configured to store external-link information for an attribute of the external link corresponding to the identifier of the external link; a checking unit configured to check, according to a value of the attribute found by the querying unit, the resource information received by the receiving unit; and a storing unit configured to store the acquired resource or acquired resource location information according to the storage location information received by the receiving unit.

According to another aspect, an embodiment of the present invention provides a client, including an acquiring unit configured to acquire resource information of a resource to be uploaded by the client; and a sending unit configured to send a resource check request to a storage server, where the resource check request carries the resource information acquired by the acquiring unit, an identifier of an external link created by a second client, and storage location information corresponding to the external link, so that the storage server searches, according to the identifier of the external link, a database configured to store external-link information for an attribute of the external link corresponding to the identifier of the external link, checks the resource information according to a value of the found attribute, and stores the acquired resource according to the storage location information after the check succeeds.

According to the method and the apparatus for acquiring a resource provided by the embodiments of the present invention, after successfully checking resource information of a resource to be uploaded by a first client, a storage server stores the acquired resource or acquired resource location information according to storage location information corresponding to an external link created by a second client. Because the external link and an external-link creator are bound to each other, the external-link creator can acquire the resource through the external link created by the external-link creator.

BRIEF DESCRIPTION OF DRAWINGS

FIG. 1 is a schematic architectural diagram of a system for acquiring a resource according to an embodiment of the present invention;

FIG. 2 is a flowchart of a method for acquiring a resource according to an embodiment of the present invention;

DESCRIPTION OF EMBODIMENTS

Figure 3:
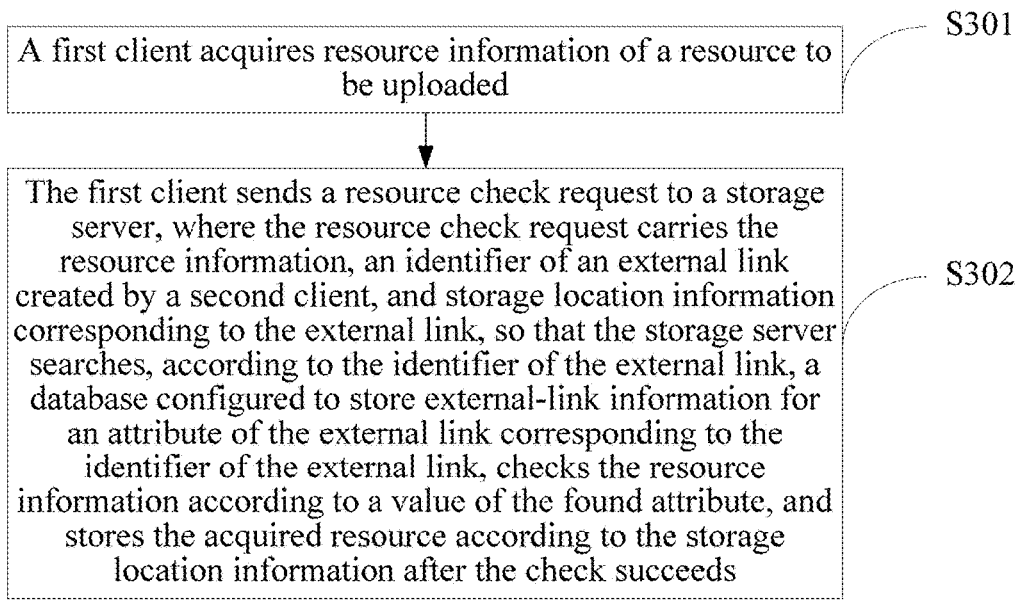
FIG. 3 is a flowchart of another method for acquiring a resource according to an embodiment of the present invention.

The technical solutions of the present invention will be clearly and completely described in the following pages with reference to the accompanying drawings. It is obvious that the embodiments to be described are only a part rather than all of the embodiments of the present invention. All other embodiments obtained by a person of ordinary skill in the art based on the embodiments of the present invention without creative efforts shall fall within the protection scope of the present invention.

FIG. 1 is a schematic architectural diagram of a system for acquiring a resource according to an embodiment of the present invention. When an external-link creator needs to create an external link, a second client sends an external-link creation request to a storage server. The storage server creates the external link according to the external-link creation request, and sends the created external link to the second client. When a public visitor obtains the external link created by the external-link creator and needs to upload a resource to the external-link creator, the storage server receives a resource information check request sent by a first client, acquires the resource to be uploaded by the first client, and stores the acquired resource into a storage location corresponding to the external link.

In the following embodiments of the present invention, the term "storage server" represents a network hard disk, which is formed by multiple storage nodes. The resource to be uploaded by the first client may be stored on a storage node that receives the resource check request, or may be stored on another storage node at the server, and this is not limited by this embodiment of the present invention. The storage node that receives the external-link creation request sent by the second client and the storage node that receives the resource check request sent by the first client may be a same storage node, or may be different storage nodes, and this is not limited by this embodiment of the present invention.

For exemplification but not for limitation, the storage node may include a mainframe, a mid-range computer, a minicomputer, or a microcomputer.

For exemplification but not for limitation, the first client may include a personal computer, a tablet computer, a smart phone terminal, a netbook, or another device capable of being networked.

For exemplification but not for limitation, the second client may include a personal computer, a tablet computer, a smart phone terminal, a netbook, or another device capable of being networked.

The external link refers to a uniform resource locator (URL). The external link and the external-link creator are bound to each other. After obtaining the external link, the public visitor may upload a resource to the storage location corresponding to the external link, and may also download a resource stored in the storage location corresponding to the external link.

It should be noted that the resource check request sent by the first client carries storage location information corresponding to the external link created by the second client. The storage location information may be configured to indicate a location for storing the resource to be uploaded by the first client, or configured to indicate a location for storing resource location information of the resource to be uploaded by the first client.

Based on the system architecture diagram shown in FIG. 1, an embodiment of the present invention provides a method for acquiring a resource. As shown in FIG. 2, the method includes the following steps:

S201: A storage server receives a resource check request sent by a first client, where the resource check request carries resource information of a resource to be uploaded by the first client, an identifier of an external link created by a second client, and storage location information corresponding to the external link.

It should be noted that, when an external-link creator needs to create an external link, the second client creates the external link. When a public visitor obtains the external link created by the external-link creator and needs to upload a resource, the first client sends the resource check request to the storage server.

For exemplification but not for limitation, the resource to be uploaded by the first client may include a text file, an audio file, a video file, or another resource that can be stored by the storage server, such as a message. The resource information is configured to describe the resource.

It should be noted that a resource identifier may be configured to uniquely identify a resource, and an identifier of an external link is configured to uniquely identify the external link.

It should be noted that the storage location information in this embodiment is configured to indicate a location for storing the resource to be uploaded by the first client.

It should be noted that the storage location information may be determined by the second client when the second client creates the external link. The storage location information is information about a path in which the external-link creator stores the resource on a network hard disk. The storage location information may be specified by the external-link creator, or may be specified by the storage server by default if not specified by the external-link creator.

Before the storage server receives the resource check request sent by the first client, the storage server may receive an external-link creation request sent by the second client. The external-link creation request carries a value of an attribute of the external link. The storage server reviews the value of the attribute of the external link. If the review is passed, the storage server generates the identifier of the external link, stores correspondence between the identifier of the external link and the value of the attribute of the external link into a database configured to store external-link information, and sends an external-link creation success response to the second client. The external-link creation success response carries the identifier of the external link.

It should be noted that the value of the attribute of the external link carried by the external-link creation request includes a title of the external link and a content description of the external link.

The attribute of the external link carried by the external-link creation request may further include a format of a resource corresponding to the external link and a size threshold of a resource corresponding to the external link.

After creating the external link, the external-link creator may further update the value of the attribute of the external link. After the storage server sends the external-link creation success response to the second client, the second client may further send an external-link attribute update request to the storage server. The external-link attribute update request carries an updated value of the attribute of the external link and the identifier of the external link. The storage server searches, according to the identifier of the external link, the database configured to store external-link information for the attribute of the external link corresponding to the identifier of the external link, and updates the value of the found attribute with the updated value of the attribute.

It should be noted that the updating the value of the found attribute with the updated value of the attribute refers to replacing the value of the found attribute with the updated value of the attribute.

S202: The storage server searches, according to the identifier of the external link, the database configured to store external-link information for the attribute of the external link corresponding to the identifier of the external link, and checks the resource information according to the value of the found attribute.

It should be noted that, the storage server determines whether the resource information matches the value of the found attribute. If yes, the storage server determines that the check succeeds; otherwise, the storage server determines that the check fails.

It should be noted that, the attribute found by the storage server may include the format of a resource corresponding to the external link and the size threshold of a resource corresponding to the external link.

S203: If the check succeeds, the storage server stores the acquired resource or acquired resource location information according to the storage location information.

Before the storage server stores the acquired resource, the storage server may further acquire the resource. A manner of acquiring, by the storage server, the resource may include any one of the following manners:

In a first manner, the resource is stored at the server. The resource information includes a resource identifier of the resource. The storage server searches, according to the resource identifier in the resource information, a database configured to store resource location information for resource location information corresponding to the resource identifier, and acquires, according to the found resource location information, the resource stored at the server.

The storage server stores in advance correspondence between the resource identifier and the resource location information into the database configured to store resource location information.

It should be noted that the resource location information in this embodiment is configured to indicate a location where the resource is stored.

In a second manner, the resource is stored on the first client. The storage server sends a resource check success response to the first client, and receives the resource sent by the first client.

After the storage server stores the acquired resource, when the second client needs to download the resource stored by the storage server, the storage server may send the stored resource to the second client.

Before the storage server stores the acquired resource location information, the storage server may further acquire the resource location information. The storage server may acquire the resource location information in the following manner:

The resource information includes a resource identifier of the resource. The storage server searches, according to the resource identifier in the resource information, the database configured to store resource location information for the resource location information corresponding to the resource identifier.

After the storage server stores, the acquired resource location information according to the storage location information, when the second client needs to download the resource, the storage server may further send the resource acquired according to the resource location information to the second client.

The database configured to store resource location information and the database configured to store external-link information may be a same database, or may be different databases, and this is not limited by this embodiment of the present invention.

According to the method for acquiring a resource provided by this embodiment of the present invention, after successfully checking resource information of a resource to be uploaded by a first client, a storage server stores the acquired resource or acquired resource location information according to storage location information corresponding to an external link created by a second client. Because the external link and an external-link creator are bound to each other, the external-link creator can acquire the resource through the external link created by the external-link creator. Secondly, the storage server may search, according to a resource identifier in the resource information, a database configured to store resource location information for resource location information corresponding to the resource identifier, and acquire, according to the found resource location information, the resource stored at the server, so that the storage server can make full use of the resource stored by a public visitor at the server, thereby saving an overhead of the first client in uploading the resource to the storage server. Furthermore, after receiving a resource check success response sent by the storage server, the first client sends the resource to be uploaded by the first client to the storage server, so that all public visitors can upload a locally stored resource to the storage server. Furthermore, the storage server may search, according to the resource identifier in the resource information, the database configured to store resource location information for the resource location information corresponding to the resource identifier, and store the resource location information according to the storage location information corresponding to the external link, thereby saving a storage resource of the storage server. Finally, after receiving an external-link attribute update request sent by the second client, the storage server can update a value of an attribute of the external link, so that the external-link creator can still edit the value of the attribute of the external link after creating the external link.

FIG. 3 is a flowchart of a method for acquiring a resource according to an embodiment of the present invention. The method includes the following steps:

S301: A first client acquires resource information of a resource to be uploaded.

A manner of acquiring, by the first client, the resource information of the resource to be uploaded may include any one of the following manners:

In a first manner, the resource is stored on the first client. After a public visitor determines the resource to be uploaded that is stored on the first client, the first client acquires the resource information of the resource stored on the first client.

In a second manner, the resource is stored at the server. The first client logs in to a storage server, and receives a resource information list sent by the storage server. The resource information list includes the resource information of the resource stored at the server by the first client. After a public visitor selects the resource information of the resource to be uploaded from the resource information list, the first client acquires the resource information selected by the public visitor from the resource information list.

S302: The first client sends a resource check request to a storage server, where the resource check request carries the resource information, an identifier of an external link created by a second client, and storage location information corresponding to the external link, so that the storage server searches, according to the identifier of the external link, a database configured to store external-link information for an attribute of the external link corresponding to the identifier of the external link, checks the resource information according to a value of the found attribute, and stores the acquired resource according to the storage location information after the check succeeds.

After the storage server successfully performs the check, the first client may receive a resource check success response sent by the storage server, and send the resource to be uploaded by the first client to the storage server, so that the storage server obtains the resource to be uploaded by the first client.

According to a method for acquiring a resource provided by this embodiment of the present invention, after successfully checking resource information of a resource to be uploaded by a first client, a storage server may acquire the resource to be uploaded by the first client, and store the acquired resource according to storage location information corresponding to an external link created by a second client. Because the external link and an external-link creator are bound to each other, the external-link creator can acquire the resource through the external link created by the external-link creator. Secondly, after receiving a resource check success response sent by the storage server, the first client may send the resource to be uploaded by the first client to the storage server, so that all public visitors can upload a locally stored resource to the storage server.

Figure 4:
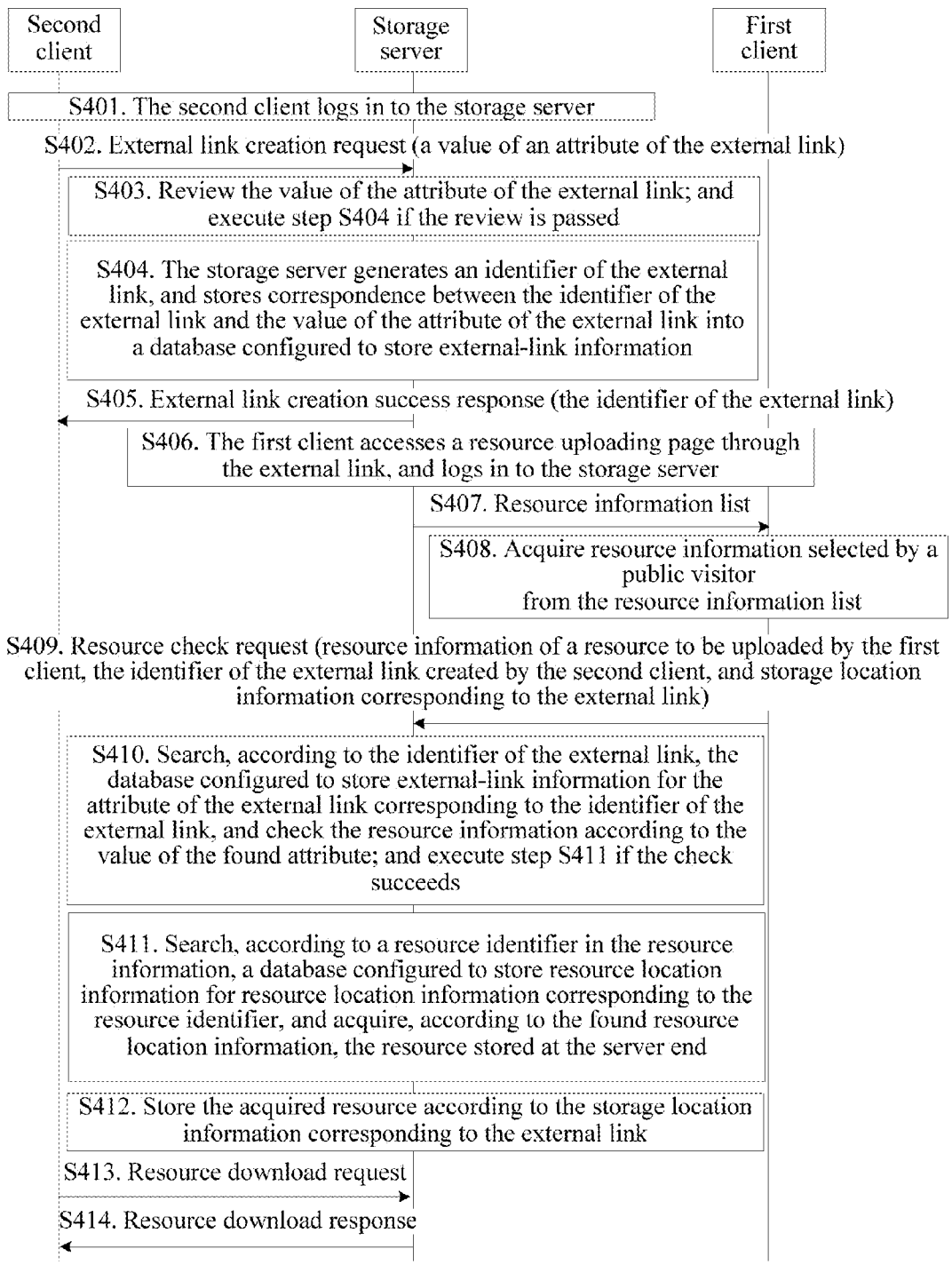
FIG. 4 is a protocol diagram of still another method for acquiring a resource according to an embodiment of the present invention.

FIG. 4 is a protocol diagram of a method for acquiring a resource according to an embodiment of the present invention. The method includes the following steps:

S401: When an external-link creator needs to create an external link, a second client logs in to a storage server.

S402: The second client sends an external-link creation request to the storage server, where the external-link creation request carries a value of an attribute of the external link.

S403: The storage server reviews the value of the attribute of the external link; and executes step S404 if the review is passed; otherwise the storage server sends an external-link creation failure response to the second client.

The value of the attribute of the external link includes a title of the external link and a content description of the external link. A manner of reviewing, by the storage server, the value of the attribute of the external link may include the following manner:

The storage server reviews the title of the external link and the content description of the external link. If the title of the external link and the content description of the external link do not include a sensitive word, the storage server determines that the review is passed; otherwise, the storage server determines that the review is not passed.

It should be noted that sensitive words may be stored in a sensitive-word database in advance. If the title of the external link and the content description of the external link do not include any sensitive word in the sensitive-word database, the storage server determines that the review is passed; otherwise, the storage server determines that the review is not passed.

The attribute of the external link may further include a format of a resource corresponding to the external link and a size threshold of a resource corresponding to the external link.

S404: The storage server generates an identifier of the external link, and stores correspondence between the identifier of the external link and the value of the attribute of the external link into a database configured to store external-link information.

For example, the value of the attribute of the external link received by the storage server may be expressed as "Title='Abstract encryption algorithm', Content Description=A feature of the abstract encryption algorithm is that no key is required during encryption and encrypted data cannot be decrypted', Format='.doc', Size Threshold='5 MB'". After successfully reviewing the title of the external link and the content description of the external link, the storage server generates the identifier of the external link, such as c0079527dx, and stores the correspondence between the generated identifier of the external link and the value of the attribute of the external link into a data table of the database configured to store external-link information. For exemplification but not for limitation, the storage server may store the value of the attribute of the external link into a column of the data table, as shown in Table 1, and may also store the value of the attribute of the external link into each column of the data table, as shown in Table 2.

TABLE 1

| Identifier of the External Link | Attribute |
|---|---|
| c0079527dx | Title = Abstract encryption algorithm<br>Content Description = A feature of the abstract encryption algorithm is that no key is required during encryption and encrypted data cannot be decrypted<br>Format = .doc<br>Size Threshold = 5 MB |
| . . . | . . . |

TABLE 2

| Identifier of the External Link | Title | Content Description | Format | Size Threshold |
|---|---|---|---|---|
| c0079527dx | Abstract encryption algorithm | A feature of the abstract encryption algorithm is that no key is required during encryption and encrypted data cannot be decrypted | .doc | 5 MB |
| ... | ... | ... | ... | ... |

Alternatively, the attribute of the external link may further include a validity period of the external link, a password of the external link, and a download right of a resource corresponding to the external link.

Alternatively, the storage server may further store correspondence between the identifier of the external link and storage location information corresponding to the external link into the database configured to store external-link information.

S405: The storage server sends an external-link creation success response to the second client, where the external-link creation success response carries the identifier of the external link, so that the external-link creator is informed of the external link created by the external-link creator.

After the storage server sends the external-link creation success response to the second client, the second client may further send an external-link attribute update request to the storage server, where the external-link attribute update request carries an updated value of the attribute of the external link and the identifier of the external link. The storage server searches, according to the identifier of the external link, the database configured to store external-link information for the attribute of the external link corresponding to the identifier of the external link, and updates the value of the found attribute with the updated value of the attribute.

S406: When a public visitor needs to upload a resource, a first client accesses a resource uploading page through the external link, and logs in to the storage server.

It should be noted that after creating the external link, the external-link creator acquires a URL corresponding to the external link. The external-link creator may inform another user of the URL or disseminate the URL on the Internet, so that a public visitor can access, through the URL, the resource uploading page corresponding to the external link.

S407: The storage server sends a resource information list to the first client, where the resource information list includes resource information of resources stored at the server by the first client.

For example, for exemplification but not for limitation, if the public visitor stores five files at the server, the resource information list shows file information of each of the five files.

S408: The first client acquires resource information selected by the public visitor from the resource information list.

For example, for exemplification but not for limitation, if the public visitor stores five files at the server and needs to upload a file A among the five files to a storage area of the external-link creator at the server, after the public visitor selects the file A from the resource information list received by the first client, the first client acquires resource information selected by the public visitor from the resource information list.

S409: The first client sends a resource check request to the storage server, where the resource check request carries the resource information of the resource to be uploaded by the first client, the identifier of the external link created by the second client, and the storage location information corresponding to the external link.

It should be noted that in this embodiment of the present invention, a specific form of the resource uploading page is not limited. For exemplification but not for limitation, the resource uploading page may be a web page document described through the Hypertext Markup Language (HTML), where the web page document includes the identifier of the external link and the storage location information corresponding to the external link. After accessing the web page document, the first client can acquire the identifier of the external link and a storage location corresponding to the external link.

It should be noted that the storage location information in this embodiment is configured to indicate a location for storing the resource to be uploaded by the first client.

It should be noted that the storage location information may be determined by the second client when the second client creates the external link. The storage location information is information about a path in which the external-link creator stores the resource on a network hard disk. The storage location information may be specified by the external-link creator, or may be specified by the storage server by default if not specified by the external-link creator.

S410: The storage server searches, according to the identifier of the external link, the database configured to store external-link information for the attribute of the external link corresponding to the identifier of the external link, checks the resource information according to the value of the found attribute, and executes step S411 if the check succeeds; otherwise, the storage server sends a resource check failure response to the first client.

The attribute found by the storage server may include the format of the resource corresponding to the external link and the size threshold of the resource corresponding to the external link. The resource information may include a format and a size of the resource to be uploaded by the first client. A manner of checking, by the storage server, the resource information according to the value of the found attribute may include the following:

The storage server checks, according to the found format of the resource corresponding to the external link and the found size threshold of the resource corresponding to the external link, the format of the resource in the resource information and the size of the resource in the resource information; and if the format of the resource in the resource information is the same as one format of the resource corresponding to the external link, and the size of the resource in the resource information is not greater than the size threshold of the resource corresponding to the external link, the storage server determines that the check succeeds; otherwise, the storage server determines that the check fails.

It should be noted that there may be multiple formats of a resource corresponding to the external link, and the format of the resource to be uploaded by the first client needs only to meet one of the formats.

S411: The resource information of the resource may further include a resource identifier of the resource. The storage server searches, according to the resource identifier in the resource information, a database configured to store resource location information for resource location information corresponding to the resource identifier, and acquires, according to the found resource location information, the resource stored at the server.

It should be noted that the resource identifier is configured to uniquely identify the resource, and the storage server may find the resource corresponding to the resource identifier according to the resource identifier.

For example, for exemplification but not for limitation, if the public visitor stores five files at the server and needs to upload a file A among the five files to a storage area of the external-link creator at the server, the resource information acquired by the storage server includes a resource identifier of the file A. The storage server searches, according to the resource identifier of the file A, the database configured to store resource location information for a location where the file A is stored at the server, and the storage server acquires the file A according to the location where the file A is stored at the server.

Alternatively, before the storage server searches, according to the resource identifier in the resource information, for the resource stored at the server, the storage server determines that a free storage space of the external-link creator is still larger than the size of the resource to be uploaded by the first client.

S412: The storage server stores the acquired resource according to the storage location information corresponding to the external link.

S413: When the second client needs to download the resource stored by the storage server, the second client sends a resource download request to the storage server.

The resource download request is used to request downloading the resource uploaded by the first client.

S414: The storage server sends a resource download response to the second client, where the resource download response carries the stored resource.

In this embodiment of the present invention, the storage server may also store in step S412, directly according to the storage location information, the resource location information found in step S411. When the second client needs to download the resource, the storage server sends the resource that is acquired according to the resource location information to the second client.

According to the method for acquiring a resource provided by this embodiment of the present invention, after successfully checking resource information of a resource to be uploaded by a first client, a storage server stores the acquired resource or acquired resource location information according to storage location information corresponding to an external link created by a second client, so that an external-link creator can acquire the resource according to the external link created by the external-link creator. Secondly, the storage server may search, according to a resource identifier in the resource information, a database configured to store resource location information for resource location information corresponding to the resource identifier resource, and acquire, according to the found resource location information, the resource stored at the server, so that the storage server can make full use of the resource stored by a public visitor at the server, thereby saving an overhead of the first client in uploading the resource to the storage server. Furthermore, the storage server may search, according to the resource identifier in the resource information, the database configured to store resource location information for the resource location information corresponding to the resource identifier, and store the resource location information according to the storage location information corresponding to the external link, thereby saving a storage resource of the storage server. In addition, after receiving an external-link attribute update request sent by the second client, the storage server can update a value of an attribute of the external link, so that the external-link creator can still edit the value of the attribute of the external link after creating the external link.

Figure 5:
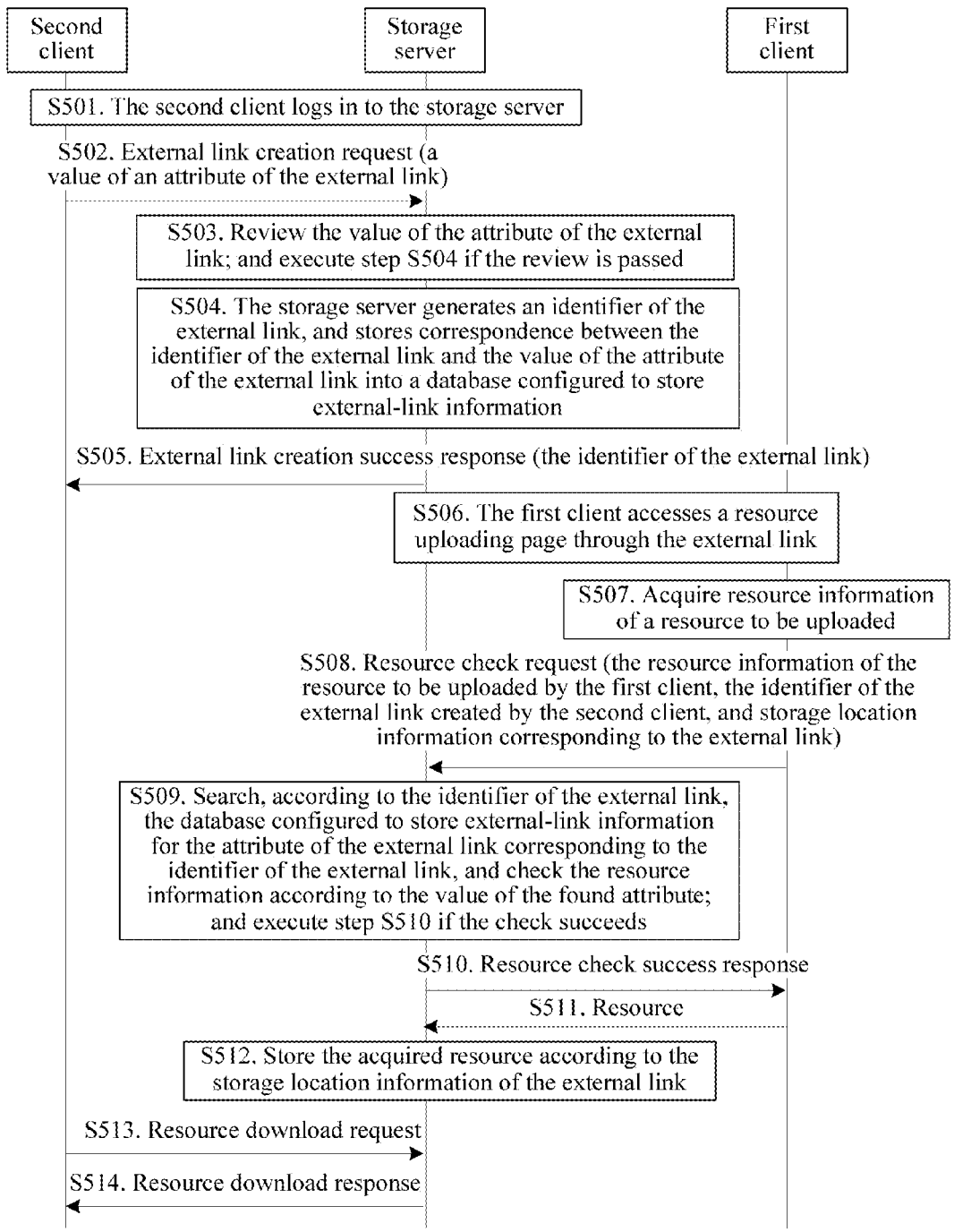
FIG. 5 is a protocol diagram of still another method for acquiring a resource according to an embodiment of the present invention.

FIG. 5 is a protocol diagram of a method for acquiring a resource according to an embodiment of the present invention. The method includes the following steps:

S501: When an external-link creator needs to create an external link, a second client logs in to a storage server.

S502: The second client sends an external-link creation request to the storage server, where the external-link creation request carries a value of an attribute of the external link.

S503: The storage server reviews the value of the attribute of the external link; and executes step S504 if the review is passed; otherwise, the storage server sends an external-link creation failure response to the second client.

It should be noted that reference may be made to step S403 for a detailed description of this step, and no further details are provided herein.

S504: The storage server generates an identifier of the external link, and stores correspondence between the identifier of the external link and the value of the attribute of the external link into a database configured to store external-link information.

It should be noted that reference may be made to step S404 for a detailed description of this step, and no further details are provided herein.

S505: The storage server sends an external-link creation success response to the second client, where the external-link creation success response carries the identifier of the external link, so that an external-link creator is informed of the external link created by the external-link creator.

It should be noted that reference may be made to step S405 for a detailed description of this step, and no further details are provided herein.

S506: When a public visitor needs to upload a resource, a first client accesses a resource uploading page through the external link.

S507: The first client acquires resource information of the resource to be uploaded.

It should be noted that after the public visitor determines the resource that needs to be uploaded and is stored on the first client, the first client acquires resource information of the resource to be uploaded that is selected by the public visitor and stored on the first client.

S508: The first client sends a resource check request to the storage server, where resource check request carries the resource information of the resource to be uploaded by the first client, the identifier of the external link created by the second client, and storage location information corresponding to the external link.

It should be noted that reference may be made to step S409 for a detailed description of this step, and no further details are provided herein.

S509: The storage server searches, according to the identifier of the external link, the database configured to store external-link information for the attribute of the external link corresponding to the external link, checks the resource information according to the value of the found attribute, and executes step S510 if the check succeeds; otherwise, the storage server sends a resource check failure response to the first client.

It should be noted that reference may be made to step S410 for a detailed description of this step, and no further details are repeated herein.

S510: The storage server sends a resource check success response to the first client.

S511: The first client sends the resource to be uploaded by the first client to the storage server, so that the storage server acquires the resource to be uploaded by the first client.

S512: The storage server stores the acquired resource according to a storage location corresponding to the external link.

S513: When the second client needs to download the resource, the second client sends a resource download request to the storage server.

The resource download request is used to request downloading the resource uploaded by the first client.

S514: The storage server sends a resource download response to the second client, where the resource download response carries the stored resource.

According to the method for acquiring a resource provided by this embodiment of the present invention, after successfully checking resource information of a resource to be uploaded by a first client, a storage server stores the acquired resource according to storage location information corresponding to an external link created by a second client, so that an external-link creator can acquire the resource according to the external link created by the external-link creator. Secondly, after receiving a resource check success response sent by the storage server, the first client sends the resource to be uploaded by the first client to the storage server, so that all public visitors can upload a locally stored resource to the storage server. Furthermore, after receiving an external-link attribute update request sent by the second client, the storage server updates a value of an attribute of the external link, so that the external-link creator can still edit the value of the attribute of the external link after creating the external link.

Figure 6:
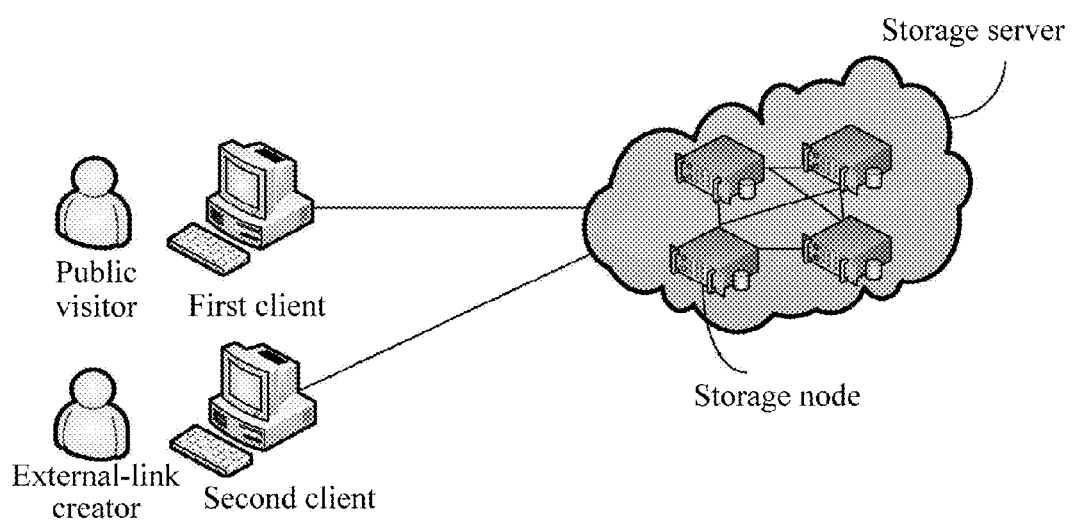
FIG. 6 is a schematic architectural diagram of another system for acquiring a resource according to an embodiment of the present invention.
Figure 7A:
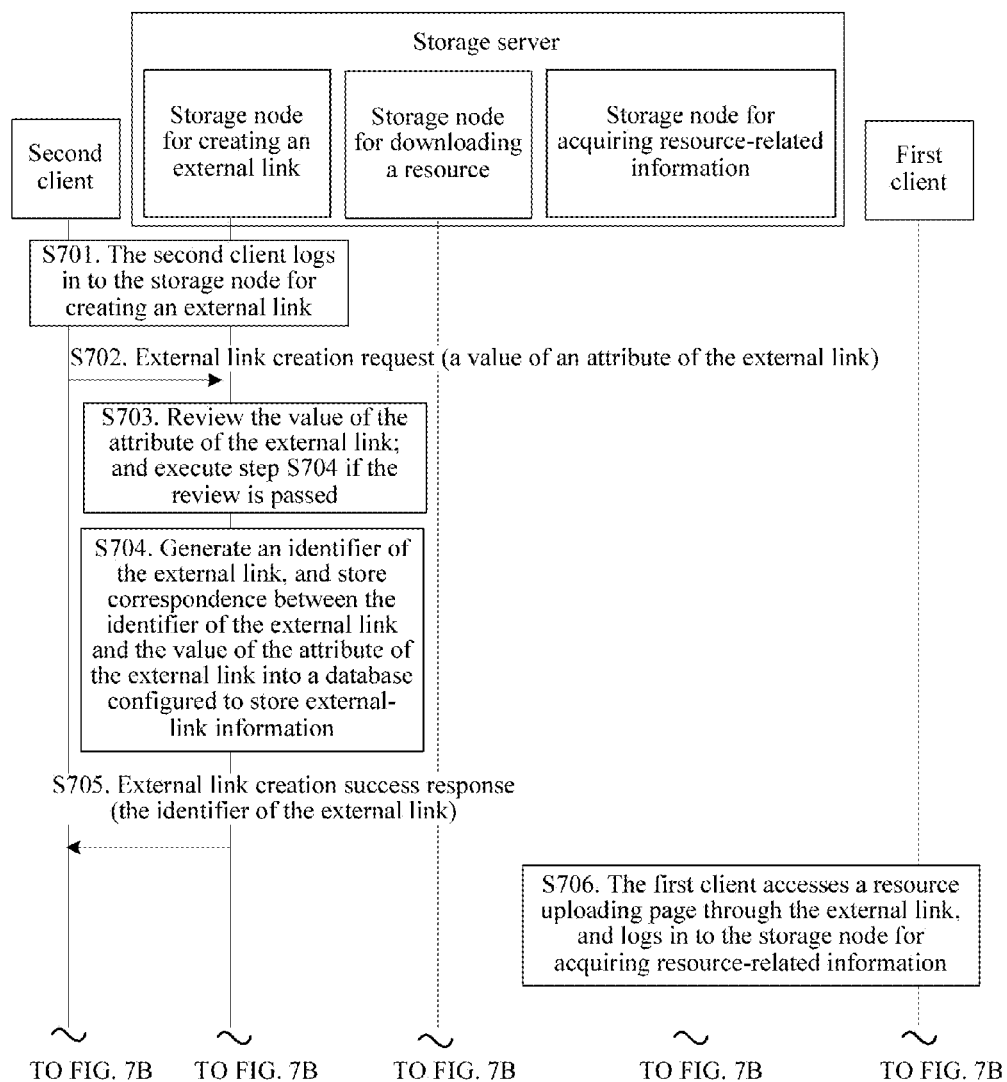
FIG. 7A and FIG. 7B are protocol diagrams of still another method for acquiring a resource according to an embodiment of the present invention.
Figure 7B:
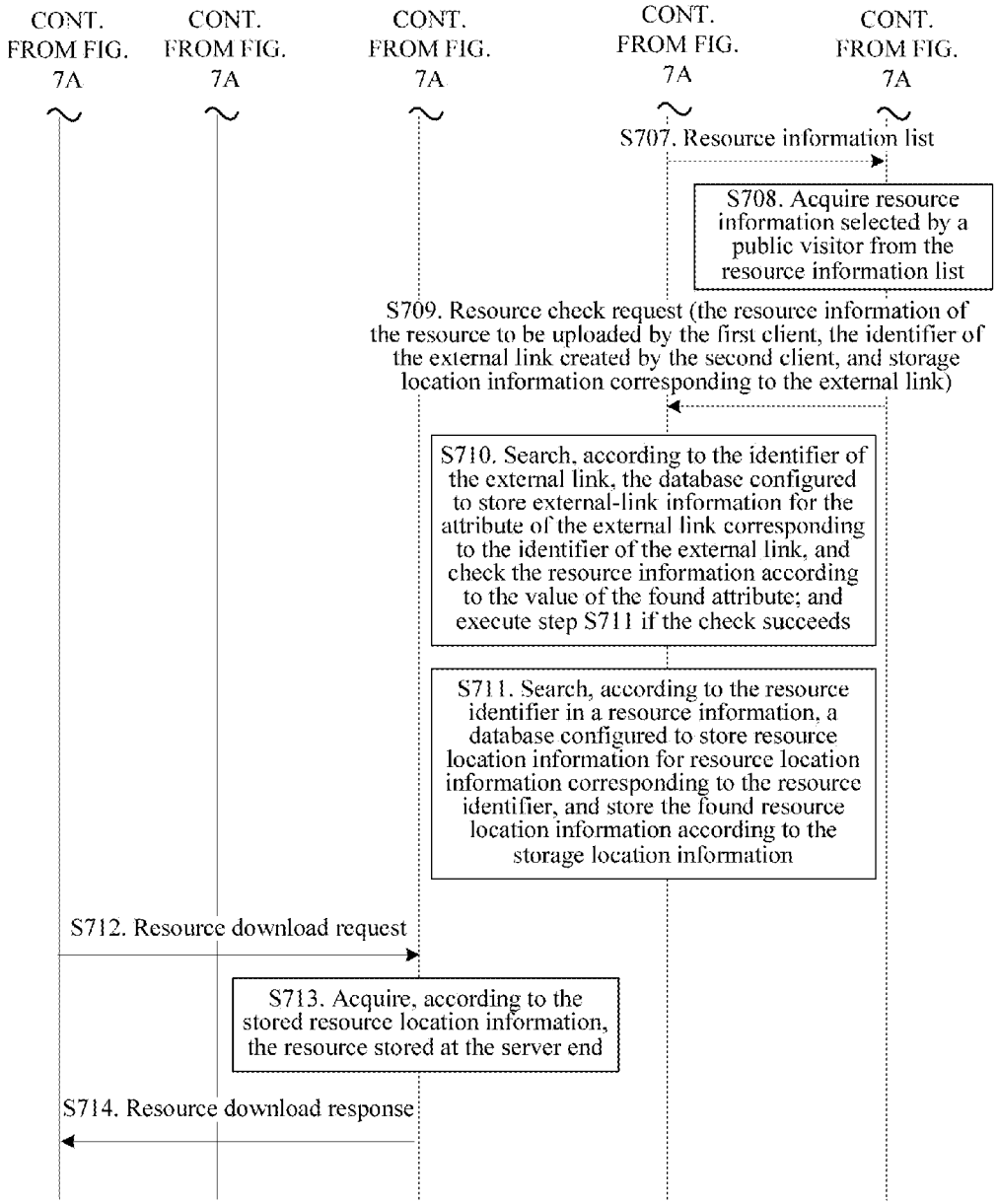

The storage server in this embodiment of the present invention is formed by several storage nodes, as shown in FIG. 6. For ease of understanding, an embodiment of the present invention provides a schematic diagram of another method for acquiring a resource. As shown in FIG. 7A and FIG. 7B, the method includes the following steps:

S701: When an external-link creator needs to create an external link, a second client logs in to a storage node for creating an external link.

S702: The second client sends an external-link creation request to the storage node for creating an external link, where the external-link creation request carries a value of an attribute of the external link.

S703: The storage node for creating an external link reviews the value of the attribute of the external link, and executes step S704 if the review is passed; otherwise, the storage node for creating an external link sends an external-link creation failure response to the second client. For details about the reviewing, by the storage node for creating an external link, the value of the attribute of the external link, reference may be made to step S403 and no further details are provided herein.

S704: The storage node for creating an external link generates an identifier of the external link, and stores correspondence between the identifier of the external link and the value of the attribute of the external link into a database configured to store external-link information.

Alternatively, the attribute of the external link may further include a validity period of the external link, a password of the external link, and a download right of a resource corresponding to the external link.

Alternatively, the storage node for creating an external link may further store correspondence between the identifier of the external link and storage location information corresponding to the external link into the database configured to store external-link information.

S705: The storage node for creating an external link sends an external-link creation success response to the second client, where the external-link creation success response carries the identifier of the external link, so that the external-link creator is informed of the external link created by the external-link creator.

After the storage node for creating an external link sends the external-link creation success response to the second client, the second client may further send an external-link attribute update request to a storage node for updating an external link. The external-link attribute update request carries an updated value of the attribute of the external link and the identifier of the external link. The storage node for updating an external link searches, according to the identifier of the external link, the database configured to store external-link information for the attribute of the external link corresponding to the identifier of the external link, and updates the value of the found attribute with the updated value of the attribute.

S706: When a public visitor needs to upload a resource, a first client accesses a resource uploading page through the external link, and logs in to a storage node for acquiring resource-related information.

S707: The storage node for acquiring resource-related information sends a resource information list to the first client, where resource information list includes resource information of resources stored at the server by the first client.

For example, the public visitor stores two files on a storage node A, and stores three files on a storage node B. After finding the files that are stored by the public visitor on the storage node A and the storage node B, the storage node for acquiring resource-related information constructs a resource information list sent to the first client, where the resource information list includes file information of the five files stored at the server by the public visitor.

S708: The first client acquires resource information selected by the public visitor from the resource information list.

For example, for exemplification but not for limitation, if the public visitor stores five files at the server and needs to upload a file A among the five files to a storage area of the external-link creator at the server, after the public visitor selects the file A from the resource information list received by the first client, the first client acquires resource information selected by the public visitor from the resource information list.

S709: The first client sends a resource check request to the storage node for acquiring resource-related information, where the resource check request carries the resource information of the resource to be uploaded by the first client, the identifier of the external link created by the second client, and the storage location information corresponding to the external link.

Reference may be made to step S409 for a detailed description of this step, and no further details are repeated herein.

S710: The storage node for acquiring resource-related information searches, according to the identifier of the external link, the database configured to store external-link information for the attribute of the external link corresponding to the identifier of the external link, checks the resource information according to the value of the found attribute, and executes step S711 if the check succeeds; otherwise, the storage node for acquiring resource-related information sends a resource check failure response to the first client.

For details about the check, by the storage node for acquiring resource-related information, the resource information, reference may be made to step S410 and no further details are provided herein.

S711: The storage node for acquiring resource-related information searches, according to a resource identifier in the resource information, a database configured to store resource location information for resource location information corresponding to the resource identifier, and stores the found resource location information according to the storage location information.

S712: When the second client needs to download the stored resource, the second client sends a resource download request to a storage node for downloading a resource.

The resource download request is used to request downloading the resource uploaded by the first client, and the resource download request may carry the resource identifier.

S713: The storage node for downloading a resource acquires, according to the stored resource location information, the resource stored at the server.

Correspondence between the resource identifier and the resource location information may be stored in advance. The storage node for downloading a resource obtains the resource location information corresponding to the resource identifier according to the resource identifier carried in the resource download request.

S714: The storage node for downloading a resource sends a download response to the second client, where the download response carries the acquired resource.

It should be noted that any two or more storage nodes among the storage node for creating an external link, the storage node for updating an external link, the storage node for acquiring resource-related information, and the storage node for downloading a resource may be a same storage node, or may be different storage nodes, and this is not limited by this embodiment of the present invention.

According to the method for acquiring a resource provided by this embodiment of the present invention, after successfully checking resource information of a resource to be uploaded by a first client, a storage node for acquiring resource-related information stores the acquired resource or acquired resource location information according to storage location information corresponding to an external link created by a second client. Because the storage node for acquiring resource-related information can acquire the resource directly according to the resource location information, an external-link creator can acquire the resource through the external link created by the external-link creator. Secondly, the storage node for acquiring resource-related information can search, according to a resource identifier in the resource information, a database configured to store resource location information for resource location information corresponding to the resource identifier resource, and store the found resource location information, thereby saving an overhead of the first client in uploading the resource to the storage node for acquiring resource-related information. Furthermore, the storage node for acquiring resource-related information stores only the resource location information of the resource stored at the server by the first client. When the second client needs to download the resource, the storage node for acquiring resource-related information acquires the resource directly according to the stored resource location information, thereby improving storage efficiency at the server and saving a storage resource at the server. In addition, after receiving an external-link attribute update request sent by the second client, a storage node for updating an external link can update a value of an attribute of the external link, so that the external-link creator can still edit the value of the attribute of the external link after creating the external link.

Figure 8:
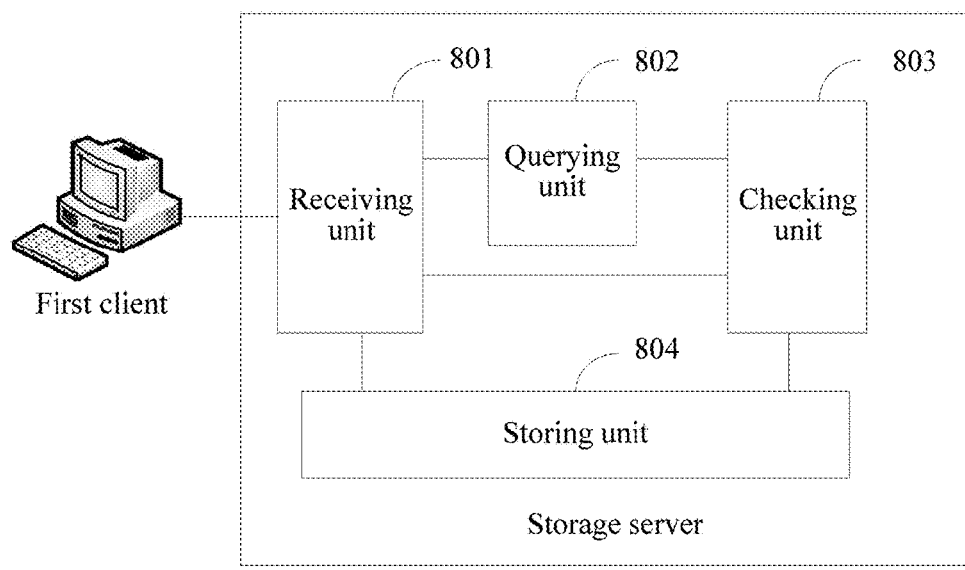
FIG. 8 is a schematic structural diagram of a storage server according to an embodiment of the present invention.

FIG. 8 is a schematic structural diagram of a storage server according to an embodiment of the present invention. The storage server may be applied in the system architecture shown in FIG. 1, and the storage server includes a receiving unit 801 configured to receive a resource check request sent by a first client, where the resource check request carries resource information of a resource to be uploaded by the first client, an identifier of an external link created by a second client, and storage location information corresponding to the external link; a querying unit 802 configured to search, according to the identifier of the external link received by the receiving unit 801, a database configured to store external-link information for an attribute of the external link corresponding to the identifier of the external link; a checking unit 803 configured to check, according to a value of the attribute found by the querying unit 802, the resource information received by the receiving unit 801; and a storing unit 804 configured to store the acquired resource or acquired resource location information according to the storage location information received by the receiving unit 801 after the checking unit 803 successfully performs the check.

The storage server further includes an acquiring unit configured to search, according to a resource identifier in the resource information received by the receiving unit 801, a database configured to store resource location information for resource location information corresponding to the resource identifier, and acquire, according to the found resource location information, the resource stored at the server.

The querying unit 802 may be further configured to search, according to the resource identifier in the resource information received by the receiving unit 801, the database configured to store resource location information for the resource location information corresponding to the resource identifier.

The storage server may further include a first sending unit, where the first sending unit is configured to send, when the second client needs to download a resource, the resource that is acquired according to the resource location information stored by the storing unit 804 to the second client.

The first sending unit may be further configured to send, after the first client successfully logs in to the storage server, a resource information list to the first client, where the resource information list includes resource information of resources stored at the server by the first client so that the first client acquires the resource information of the resource to be uploaded.

In a specific implementation manner, the storage server may further include a second sending unit, where the second sending unit is configured to send a resource check success response to the first client.

The receiving unit 801 may be further configured to receive the resource sent by the first client, so that the storage server acquires the resource.

The receiving unit 801 may be further configured to receive an external-link creation request sent by the second client, where the external-link creation request carries the value of the attribute of the external link.

The storage server further includes a reviewing unit. The reviewing unit is configured to review the value of the attribute of the external link received by the receiving unit 801, and if the review is passed, generate the identifier of the external link, store correspondence between the identifier of the external link and the value of the attribute of the external link into the database configured to store external-link information, and send an external-link creation success response to the second client, where the external-link creation success response carries the identifier of the external link.

The reviewing unit may be configured to review a title of the external link and a content description of the external link that are received by the receiving unit 801, determine that the review is passed if the title of the external link and the content description of the external link do not include a sensitive word, or otherwise determine that the review is not passed.

The receiving unit 801 may be further configured to receive an external-link attribute update request sent by the second client, where the external-link attribute update request carries an updated value of the attribute of the external link and the identifier of the external link.

The storage server further includes an updating unit. The updating unit is configured to search, according to the identifier of the external link received by the receiving unit 801, the external-link information database for the attribute of the external link corresponding to the identifier of the external link, and update the value of the found attribute with the updated value of the attribute received by the receiving unit 801.

The checking unit 803 may be configured to check, according to a format of a resource corresponding to the external link and a size threshold of a resource corresponding to the external link that are found by the querying 802, a format of the resource in the resource information received by the receiving unit 801 and a size of the resource in the resource information; and if the format of the resource in the resource information received by the receiving unit 801 is the same as one format of the resource found by the querying unit 802 and the size of the resource in the resource information received by the receiving unit 801 is not greater than the size threshold of the resource found by the querying unit 802, determine that the check succeeds, or otherwise determine that the check fails.

According to the storage server provided by this embodiment of the present invention, after a checking unit of a storage server successfully checks resource information of a resource to be uploaded by a first client, a storing unit stores the acquired resource or acquired resource location information according to storage location information of an external link, so that an external-link creator can acquire the resource through the external link created by the external-link creator. Secondly, an acquiring unit may search, according to a resource identifier in the resource information, a database configured to store resource location information for resource location information corresponding to the resource identifier resource, and acquire, according to the found resource location information, the resource stored at the server, so that the storage server can make full use of the resource stored by a public visitor at the server, thereby saving an overhead of the first client in uploading the resource to the storage server. Furthermore, after a second sending unit of the storage server sends a resource check success response to the first client, a receiving unit can receive the resource to be uploaded by the first client that is sent by the first client, so that all public visitors can upload a locally stored resource to the storage server. In addition, after the receiving unit receives an external-link attribute update request sent by a second client, an updating unit of the storage server updates a value of an attribute of the external link created by the second client, so that the external-link creator can still edit the value of the attribute of the external link after creating the external link.

Figure 9:
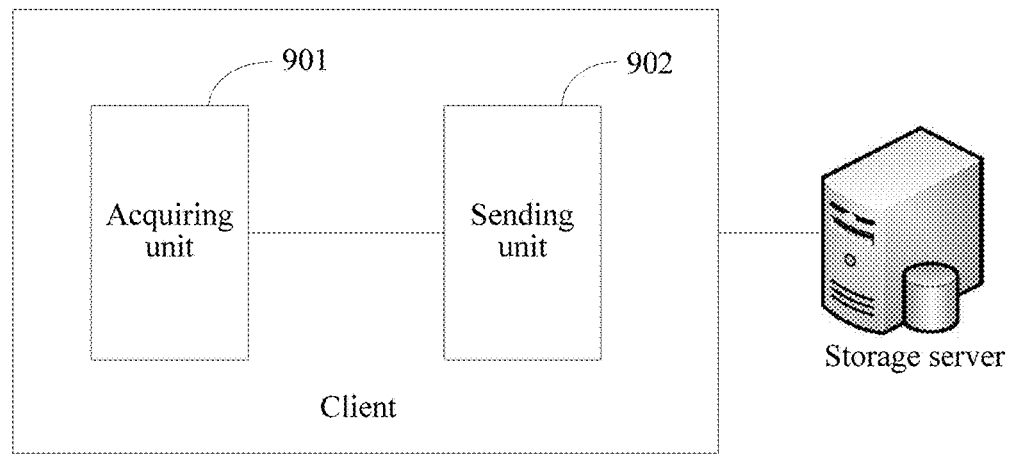
FIG. 9 is a schematic structural diagram of a client according to an embodiment of the present invention.

FIG. 9 is a schematic structural diagram of a client according to an embodiment of the present invention. The client may serve as a first client applied in the system architecture shown in FIG. 1, and the client includes an acquiring unit 901 configured to acquire resource information of a resource to be uploaded by the client; and a sending unit 902 configured to send a resource check request to a storage server, where the resource check request carries the resource information acquired by the acquiring unit 901, an identifier of an external link created by a second client, and storage location information corresponding to the external link, so that the storage server searches, according to the identifier of the external link, a database configured to store external-link information for an attribute of the external link corresponding to the identifier of the external link, checks the resource information according to a value of the found attribute, and stores the acquired resource according to the storage location information after the check succeeds.

The client may further include a login unit configured to log in to the storage server; and a first receiving unit configured to receive, after the login unit logs in to the storage server, a resource information list sent by the storage server, where the resource information list includes resource information of resources stored at the server by the first client; and then the acquiring unit 901 may be configured to acquire resource information that is selected by a public visitor from the resource information list received by the first receiving unit.

The client may further include a second receiving unit configured to receive a resource check success response sent by the storage server; and then the sending unit 902 may be further configured to send the resource to the storage server.

According to the client provided by this embodiment of the present invention, after receiving a resource check request sent by an acquiring unit of the client, a storage server checks a resource to be uploaded by the client; and after the check succeeds, acquires the resource to be uploaded by the client, and stores the acquired resource according to storage location information corresponding to an external link created by a second client, so that an external-link creator can acquire the resource through the external link created by the external-link creator. Secondly, after a second receiving unit of the client receives a resource check success response sent by the storage server, a sending unit of the client may send the resource to the storage server, so that all public visitors can upload a locally stored resource to the storage server.

According to the method and the apparatus for acquiring a resource provided by the embodiments of the present invention, after successfully checking resource information of a resource to be uploaded by a first client, a storage server stores the acquired resource or acquired resource location information according to storage location information corresponding to an external link created by a second client. Because the external link and an external-link creator are bound to each other, the external-link creator can acquire the resource through the external link created by the external-link creator. Secondly, the storage server may search, according to a resource identifier in the resource information, a database configured to store resource location information for resource location information corresponding to the resource identifier resource, and acquire, according to the found resource location information, the resource stored at the server, so that the storage server can make full use of the resource stored by a public visitor at the server, thereby saving an overhead of the first client in uploading the resource to the storage server. Furthermore, after receiving a resource check success response sent by the storage server, the first client sends the resource to be uploaded by the first client to the storage server, so that all public visitors can upload a locally stored resource to the storage server. In addition, the storage server may search, according to a resource identifier in the resource information, the database configured to store resource location information for the resource location information corresponding to the resource identifier, and store the resource location information according to the storage location information corresponding to the external link, thereby saving a storage resource of the storage server. Finally, after receiving an external-link attribute update request sent by the second client, the storage server can update a value of an attribute of the external link, so that the external-link creator can still edit the value of the attribute of the external link after creating the external link.

As can be seen from the description of the foregoing embodiments, a person of ordinary skill in the art can clearly understand that all of or a part of the steps in the method embodiments may be implemented by software plus a necessary universal hardware platform. Based on such an understanding, the technical solutions of the present invention essentially, or the part contributing to the prior art may be implemented in the form of a software product. The computer software product may be stored in a storage medium such as a read-only memory (ROM), a random access memory (RAM), a magnetic disk, or an optical disk, and include several instructions for instructing a computer device (which may be a personal computer, a server, or a network device) to perform the methods described in the embodiments of the present invention or in some parts of the embodiments of the present invention.

It should be noted that each embodiment in the specification is described in a progressive manner. The same or similar parts in the embodiments are just references to each other. Every embodiment illustrates in emphasis what is different from the other embodiments. In particular, for the apparatus embodiments, because they are basically similar to the method embodiments, the apparatus embodiments are described simply, and a process of performing specific functions for all units may be obtained with reference to the part of the description of the method embodiments. The described apparatus embodiments are merely exemplary. The units described as separate parts may be or may not be physically separate, and parts displayed as units may be or may not be physical units, that is, may be located in one position, or may be distributed on a plurality of network units. A part or all of the modules may be selected according to actual needs to achieve the objectives of the solutions of the embodiments. A person of ordinary skill in the art can understand and implement the present invention without creative efforts.

The foregoing descriptions are merely exemplary embodiments of the present invention, but are not intended to limit the protection scope of the present invention. All modifications, equivalent replacements, or improvements, or the like made within the spirit and principle of the present invention should fall within the protection scope of the present invention.

What is claimed is:

1. A method for acquiring a resource comprising:
   receiving, by a storage server, a resource check request from a first client, the resource check request carrying resource information of a resource to be uploaded by the first client, an identifier of an external link created by a second client, and storage location information corresponding to the external link;
   searching, by the storage server, according to the identifier of the external link, a database configured to store external-link information for attributes of the external link corresponding to the identifier of the external link, the database comprising a data table, the data table comprising a plurality of rows and a plurality of columns, each row comprising information for a different resource stored in the database, a first one of the columns comprising the identifier of the external link, the other columns comprising attributes of the resource, and the attributes comprising a title, a content description, a format, a threshold size, a validity period, a password, and a download right of the corresponding resource;
   checking the resource information according to a value of the found attribute, the resource information being checked by:
      determining that a size of the resource corresponding to the resource information is not greater than the threshold size;
      comparing words in the title of the resource information and words in the content description of the resource information with words in a database of sensitive words;
      comparing the format of the resource with allowed file format extensions;
      comparing a time with the validity period of the resource;
      comparing an input password with the password stored in the data table; and
      comparing an identity associated with the first client with the download right of the resource;
   storing, by the storage server, the acquired resource or acquired resource location information, when the check succeeds, according to the storage location information;
   providing, by the storage server, a resource information list to the first client, the resource information list comprising resource information of resources stored at the storage server from the first client;
   receiving, by the storage server, a resource download request corresponding to one of the resources; and
   sending, by the storage server, a resource download response that carries the one of the resources.

2. The method of claim 1, wherein before storing, by the storage server, the acquired resource according to the storage location information, the method further comprises:
   searching, by the storage server, according to a resource identifier in the resource information, a database configured to store resource location information for resource location information corresponding to the resource identifier; and
   acquiring, according to the found resource location information, the resource stored at the server.

3. The method of claim 2, wherein before receiving, by the storage server, the resource check request from the first client, the method further comprises sending, by the storage server, the resource information list to the first client, after the first client successfully logs in to the storage server, the resource information list comprising resource information of resources stored at the server by the first client.

4. The method of claim 1, wherein before storing, by the storage server, the acquired resource location information according to the storage location information, the method further comprises searching, by the storage server, according to a resource identifier in the resource information, a database configured to store resource location information for resource location information corresponding to the resource identifier.

5. The method of claim 4, wherein after storing, by the storage server, the acquired resource location information according to the storage location information, the method further comprises sending, by the storage server, the resource acquired according to the resource location information to the second client when the second client needs to download the resource.

6. The method of claim 1, wherein before storing, by the storage server, the acquired resource according to the storage location information, the method further comprises:
sending, by the storage server, a resource check success response to the first client; and
receiving, by the storage server, the resource from the first client.

7. The method of claim 1, wherein before receiving, by the storage server, the resource check request from the first client, the method further comprises:
receiving, by the storage server, an external-link creation request from the second client, the external-link creation request carrying the value of the attribute of the external link;
reviewing, by the storage server, the value of the attribute of the external link;
generating, by the storage server, the identifier of the external link when the review is passed;
storing correspondence between the identifier of the external link and the value of the attribute of the external-link in the database configured to store external-link information; and
sending an external-link creation success response to the second client, the external-link creation success response carrying the identifier of the external link.

8. A method for acquiring a resource comprising:
acquiring, by a first client, resource information of a resource to be uploaded;
sending, by the first client, a resource check request to a storage server, the resource check request carrying the resource information, an identifier of an external link created by a second client, and storage location information corresponding to the external link, the identifier of the external link being used to search a database configured to store external-link information for attributes of the external link, the database comprising a data table, the data table comprising a plurality of rows and a plurality of columns, each row comprising information for a different resource stored in the database, a first one of the columns comprising the identifier of the external link, the other columns comprising attributes of the resource, the attributes comprising a title, a content description, a format, a threshold size, a validity period, a password, and a download right of the corresponding resource, the resource information being checked according to a value of the found attribute, the acquired resource being stored by the storage server according to the storage location information after the check succeeds, the check succeeding when a size of the resource corresponding to the resource information is not greater than the threshold size, the check succeeding when words in the title of the resource information and words in the content description of the resource information are not included in a database of sensitive words, the check succeeding when the format of the resource matches allowed file format extensions, the check succeeding when a time is within the validity period of the resource, the check succeeding when an input password matches the password stored in the data table, and the check succeeding when an identity associated with the first client is included within the download right of the resource;
receiving, by the first client from the storage server, a resource information list that comprises resource information of resources stored at the storage server by the first client;
sending, by the first client, a resource download request corresponding to one of the resources; and
receiving, by the first client from the storage server, a resource download response that carries the one of the resources.

9. The method of claim 8, wherein acquiring, by the first client, the resource information of the resource to be uploaded comprises:
logging, by the first client, into the storage server;
receiving, by the first client, the resource information list from the storage server, the resource information list comprising resource information of the resources stored at the server by the first client; and
acquiring, by the first client, resource information selected by a public visitor from the resource information list.

10. The method of claim 8, wherein, after the storage server successfully performs the check, the method further comprises:
receiving, by the first client, a resource check success response from the storage server; and
sending, by the first client, the resource to the storage server.

11. A storage server comprising:
a memory comprising instructions; and
a processor coupled to the memory, the instructions executed by the processor causing the storage server to be configured to:
receive a resource check request from a first client, the resource check request carrying resource information of a resource to be uploaded by the first client, an identifier of an external link created by a second client, and storage location information corresponding to the external link;
search, according to the identifier of the external link, a database configured to store external-link information for attributes of the external link corresponding to the identifier of the external link, the database comprising a data table, the data table comprising a plurality of rows and a plurality of columns, each row comprising information for a different resource stored in the database, a first one of the columns comprising the identifier of the external link, the other columns comprising attributes of the resource, and the attributes comprising a title, a content description, a format, a threshold size, a validity period, a password, and a download right of the corresponding resource;
check, according to a value of the found attribute, the resource information, the resource information being checked by:

determining that a size of the resource corresponding to the resource information is not greater than the threshold size;
comparing words in a title of the resource information and words in a content description of the resource information with words in a database of sensitive words;
comparing the format of the resource with allowed file format extensions;
comparing a time with the validity period of the resource;
comparing an input password with the password stored in the data table; and
comparing an identity associated with the first client with the download right of the resource;
store the acquired resource or acquired resource location information according to the storage location information after the check is successfully performed;
provide a resource information list to the first client, the resource information list comprising resource information of resources stored at the storage server from the first client;
receive a resource download request corresponding to one of the resources; and
send a resource download response that carries the one of the resources.

12. The storage server of claim 11, wherein the instructions executed by the processor further cause the storage server to be configured to:
search, according to a resource identifier in the resource information, a database configured to store resource location information for resource location information corresponding to the resource identifier; and
acquire, according to the found resource location information, the resource stored at the storage server.

13. The storage server of claim 11, wherein the instructions executed by the processor further cause the storage server to be configured to search, according to a resource identifier in the resource information, a database configured to store resource location information for resource location information corresponding to the resource identifier.

14. The storage server of claim 13, wherein the instructions executed by the processor further cause the storage server to be configured to send, when the second client needs to download a resource, the resource that is acquired according to the resource location information to the second client.

15. The storage server of claim 14, wherein the instructions executed by the processor further cause the storage server to be configured to send, after the first client successfully logs in to the storage server, the resource information list to the first client, and the resource information list comprising resource information of resources stored at the server by the first client.

16. The storage server of claim 11, wherein the instructions executed by the processor further cause the storage server to be configured to:
send a resource check success response to the first client; and
receive the resource from the first client.

17. The storage server of claim 11, wherein the instructions executed by the processor further cause the storage server to be configured to:
receive an external-link creation request from the second client, the external-link creation request carrying the value of the attribute of the external link;
review the value of the attribute of the external link;
generate the identifier of the external link when the review is passed;
store correspondence between the identifier of the external link and the value of the attribute of the external link in the database configured to store external-link information; and
send an external-link creation success response to the second client, the external-link creation success response carrying the identifier of the external link.

18. The storage server of claim 11, wherein the instructions executed by the processor further cause the storage server to be configured to:
check, according to a format of a resource corresponding to the external link and the size threshold of a resource corresponding to the external link, a format of the resource in the resource information and the size of the resource in the resource information;
determine that the check succeeds when the format of the resource in the resource information is the same as one format of the resource and the size of the resource in the resource information is not greater than the size threshold of the resource; and
determine that the check fails when the format of the resource in the resource information is not the same as one format of the resource or the size of the resource in the resource information is greater than the size threshold of the resource.

19. A terminal comprising:
a memory comprising instructions; and
a processor coupled to the memory, the instructions executed by the processor causing the terminal to be configured to:
acquire resource information of a resource to be uploaded by the client;
send a resource check request to a storage server, the resource check request carrying the resource information, an identifier of an external link created by a second client, and storage location information corresponding to the external link, the identifier of the external link being used to search a database configured to store external-link information for attributes of the external link, the database comprising a data table, the data table comprising a plurality of rows and a plurality of columns, each row comprising information for a different resource stored in the database, a first one of the columns comprising the identifier of the external link, the other columns comprising attributes of the resource, the attributes comprising a title, a content description, a format, a threshold size, a validity period, a password, and a download right of the corresponding resource, the resource information being checked according to a value of the found attribute, the acquired resource being stored by the storage server according to the storage location information after the check succeeds, the check succeeding when a size of the resource corresponding to the resource information is not greater than the threshold size, the check succeeding when words in the title of the resource information and words in the content description of the resource information are not included in a database of sensitive words, the check succeeding when the format of the resource matches allowed file format extensions, the check succeeding when a time is within the validity period of the resource, the check succeeding when an input password matches the password stored in the data table, and the check succeeding when an identity associated with the first client is included within the download right of the resource;

receive, from the storage server, a resource information list that comprises resource information of resources stored at the storage server by the first client;

send a resource download request corresponding to one of the resources; and receive, from the storage server, a resource download response that carries the one of the resources.

20. The client of claim 19, wherein the instructions executed by the processor further cause the terminal to be configured to:

log in to the storage server;

receive, after logging into the storage server, the resource information list from the storage server, the resource information list comprising resource information of resources stored at the server by the first client; and acquire resource information that is selected by a public visitor from the resource information list.

21. The method of claim 8, wherein the attribute of the external link further comprises a format of a resource corresponding to the external link.

22. The method of claim 1, wherein the resource information list comprises a first plurality of files stored on a first storage node and a second plurality of files stored on a second storage node.

23. The method of claim 8, wherein the resource information list comprises a first plurality of files stored on a first storage node and a second plurality of files stored on a second storage node.

* * * * *